(12) United States Patent
Enevoldsen et al.

(10) Patent No.: US 8,310,073 B2
(45) Date of Patent: Nov. 13, 2012

(54) WIND TURBINE ARRANGEMENT AND METHOD FOR ALIGNING A WIND TURBINE WITH THE WIND DIRECTION

(75) Inventors: Peder Bay Enevoldsen, Vejle (DK); Ib Frydendal, Føvling (DK); Steffen Frydendal Poulsen, Silkeborg (DK); Rune Rubak, Silkeborg (DK)

(73) Assignee: Siemens Aktiengesellschaft, München (DE)

( * ) Notice: Subject to any disclaimer, the term of this patent is extended or adjusted under 35 U.S.C. 154(b) by 588 days.

(21) Appl. No.: 12/604,452

(22) Filed: Oct. 23, 2009

(65) Prior Publication Data

US 2010/0102559 A1   Apr. 29, 2010

(30) Foreign Application Priority Data

Oct. 28, 2008   (EP) ..................................... 08018796

(51) Int. Cl.
*F03D 9/00* (2006.01)
(52) U.S. Cl. ........................................................ 290/44
(58) Field of Classification Search .................... 290/44, 290/55, 1 B
See application file for complete search history.

(56) References Cited

U.S. PATENT DOCUMENTS

| 5,990,568 | A | 11/1999 | Hildingsson et al. |
| 2009/0039650 | A1* | 2/2009 | Nies ................................ 290/44 |
| 2009/0039651 | A1* | 2/2009 | Stiesdal .......................... 290/44 |
| 2010/0119370 | A1* | 5/2010 | Myhr .............................. 416/39 |
| 2012/0032448 | A1* | 2/2012 | Sato et al. ...................... 290/1 B |

FOREIGN PATENT DOCUMENTS

| EP | 1429025 A1 | 6/2004 |
| EP | 1559910 A1 | 8/2005 |
| GB | 2067247 A | 7/1981 |
| JP | 2005188455 A | 7/2005 |
| WO | WO 9722804 A1 | 6/1997 |

\* cited by examiner

*Primary Examiner* — Truc Nguyen

(57) ABSTRACT

A method for aligning a wind turbine with the wind direction is provided. The method includes measuring at least one first pressure at a first side of the wind turbine's nacelle, determining the pressure difference between the measured first pressure and a second pressure, and rotating the nacelle in dependence to the determined pressure difference. A wind turbine arrangement including a nacelle, a yaw alignment controller, and a yaw drive is also provided.

19 Claims, 4 Drawing Sheets

WIND TURBINE ARRANGEMENT AND METHOD FOR ALIGNING A WIND TURBINE WITH THE WIND DIRECTION

CROSS REFERENCE TO RELATED APPLICATIONS

This application claims priority of European Patent Office application No. 08018796.6 EP filed Oct. 28, 2008, which is incorporated by reference herein in its entirety.

FIELD OF INVENTION

The present invention relates to a wind turbine arrangement and to method for aligning a wind turbine with the wind direction.

BACKGROUND OF INVENTION

The alignment of, for example, horizontal axis wind turbines into a particular wind direction is crucial in order to avoid high structural loads and in order to produce optimal power. The wind direction is typically measured by use of a wind vane or by use of a sonic wind sensor.

In GB 2 067 247 A, a device for determining the wind energy in order to control wind generators, especially in order to align the position of the plane of rotation of the rotor in relation to the air flow, is disclosed. The wind energy at the rotor plane is controlled with the aid of a pressure difference measured by probes, wherein the pressure probes are arranged at the surface of the rotor blades. If the measuring system registers unequal initial wind angles in the 90° and 270° rotor position, then the blades have to be adjusted in the 0° and 180° position so that the rotor plane pivots about the tower axis so as to balance the difference in the initial wind angles at 90° and 270° again.

SUMMARY OF INVENTION

It is an objective of the present invention to provide an improved method for aligning a wind turbine with the wind direction. It is a further objective of the present invention to provide an improved wind turbine.

The first objective is solved by a method as claimed in the claims, the second objective by a wind turbine arrangement as claimed in the claims. The depending claims contain further developments of the invention.

The inventive method for aligning a wind turbine with the wind direction comprises the steps of measuring at least a first pressure at a first side of a wind turbine nacelle and determining the pressure difference between the measured first pressure and a second pressure. The nacelle is then rotated in dependence or in response to the determined pressure difference.

The second pressure may be a reference pressure which is calibrated to correspond to correct alignment of the wind turbine with the wind, or a pressure measured at a second side of the wind turbines nacelle which is located opposite to the first side. In other words, the difference between the at least one pressure value measured at one side of the nacelle and the reference pressure, or the difference between pressure values measured at both sides of the nacelle, is used by the wind turbine control system to correct yaw misalignment of the wind turbine rotor.

By using the largest object available, namely the nacelle of the wind turbine, for the pressure measurements a very robust measurement of the yaw misalignment of the wind turbine rotor can be achieved. With such robust detection of misalignments, a better alignment, i.e. a more precise alignment, can be achieved. Furthermore, an increase of structural loads and power production losses due to misalignment can be avoided. For making the measurements even more robust, and hence yaw misalignment detection, the measured first pressure and/or the measured second pressure may be integrated over time periods before determining the pressure difference.

The inventive method can be performed irrespective whether dynamic pressures or static pressures or combination thereof are measured as the first pressure and/or the second pressure. Furthermore, more than one pressure may be measured at the first side of the nacelle and/or more than one pressure may be measured at the second side of the nacelle. The pressures measured at the first side of the nacelle are then combined and/or the pressures measured at the second side of the nacelle are then combined before determining the pressure difference. Alternatively, more than one pressure difference is determined and the determined pressure differences are combined before rotating the nacelle in dependence or in response to the combined pressure difference. The pressures measured at the same side of the nacelle may result from the same kind of pressure measurement or from different kinds of pressure measurements. By combining a number of pressure measurements at each side of the nacelle the inventive method can be made even more robust. Note that in the following the teams "pressure difference" or "determined pressure difference" shall also include the combined pressure difference without explicitly mentioning it.

Optionally, a maximum limit and/or a minimum limit for the pressure difference may be defined. The rotation of the nacelle may then be started in case the pressure difference reaches or exceeds the defined maximum limit and/or the rotation of the nacelle may be stopped in case the pressure difference reaches or falls under the defined minimum limit. The maximum limit and the minimum limit may also be identical.

Moreover, the method may comprise a step of calibrating the pressure difference and/or the defined maximum limit and/or the defined minimum limit according to wind speed and/or rotational speed of the wind turbine rotor. By this measure minor non-symmetries induced into the air flow around the nacelle by the rotation of the rotor can be taken into account.

An inventive wind turbine arrangement comprises a nacelle with a first side and a second side being located opposite to the first side. It further comprises a yaw alignment controller and a yaw drive connected to the yaw alignment controller. The yaw alignment controller is designed to determine a misalignment of the wind turbine with the wind direction, i.e. a yaw error, and to produce a control signal representing a turning of the wind turbine which leads to realignment of the wind turbine with the wind direction. A yaw drive is connected to the yaw alignment controller for receiving the control signal. The yaw drive is designed to align the wind turbine with the wind direction on the basis of the control signal. In the inventive wind turbine arrangement, at least one first pressure gauge is located at the first side of the nacelle, the pressure gauge producing a first pressure signal. Furthermore, the yaw alignment controller is connected to the at least one first pressure gauge for receiving the first pressure signal. It is designed to determine the pressure difference between the first pressure signal and a second pressure signal, and to output the control signal representing a turning of the nacelle in dependence or in response to the determined pressure difference. The yaw alignment controller may be, or comprise, a PID-controller or a neuronal network or a fuzzy logic controller or an adaptive controller.

The inventive wind turbine arrangement is adapted to perform the inventive method and, hence, achieves the advantages already described with respect to the inventive method. In this respect, the turning may, in particular, be performed by using a defined maximum limit for starting the rotation and/or a defined minimum limit for stopping the rotation.

In addition to the first pressure gauge, at least one second pressure gauge may be located at the second side of the nacelle, the second pressure gauge producing the second pressure signal. In this case, the yaw alignment controller can be connected to the at least one second pressure gauge for receiving the second pressure signal. Additionally or Alternatively to the at least one second pressure gauge located at the second side of the nacelle, the wind turbine arrangement may comprise a reference pressure repository containing a reference pressure which is calibrated to correspond to correct alignment of the wind turbine with the wind. In this case, the yaw alignment controller can be connected to the reference pressure repository for receiving the reference pressure as the second pressure signal.

In the inventive wind turbine arrangement, the location of the pressure gauges may be anywhere on the nacelle sides. Furthermore, the yaw alignment controller may be located at a central control instance and be responsible for a number of wind turbines. The signals of the pressure gauges of the individual wind turbines could then, for example, be transmitted to the yaw alignment controller according to a time scheme. Preferably, an individual wind turbine may be equipped with a yaw alignment controller of its own. The yaw alignment controller may be a part of or incorporated into the wind turbine controller More than one pressure gauge may be located at the first side of the nacelle and/or more than one pressure gauge may be located at the second side of the nacelle, each pressure gauge producing a pressure signal. The yaw alignment controller is then connected to all pressure gauges for receiving the respective pressure signals and designed to combine the pressure signals from the pressure gauges located at the first side of the nacelle to a first combined pressure signal and/or to combine the pressure signals from the pressure gauges located at the second side of the nacelle to a second combined pressure signal before determining the pressure difference. Alternatively, the yaw alignment controller can be designated to determine more than one pressure difference and to combine the determined pressure differences before it outputs the control signal representing a turning of the nacelle in dependence or in response to the combined pressure difference. Measuring the pressures at more than one location at a nacelles side allows for increasing robustness in determining of the yaw misalignment further.

In order to take account for minor non-symmetries in the air flow around the nacelle induced by the rotation of the rotor the yaw alignment controller may comprise or may be connected to, a calibration unit which is designed to calibrate the difference between the first pressure signal and the second pressure signal and/or a defined maximum limit and/or a defined minimum limit according to wind speed and/or rotational speed of the rotor. In particular, the calibration unit may provide a table which defines correction values to the be made to the determined pressure difference for given values of rotor rotational speeds and/or given values of wind speeds. Instead, the correction could be done at the side of a defined pressure difference limit.

Various devices could be used as pressure gauges, for example Pitot tubes, strain gauges, Piezoelectric pressure sensors, membrane pressure sensors, etc., or combinations thereof.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
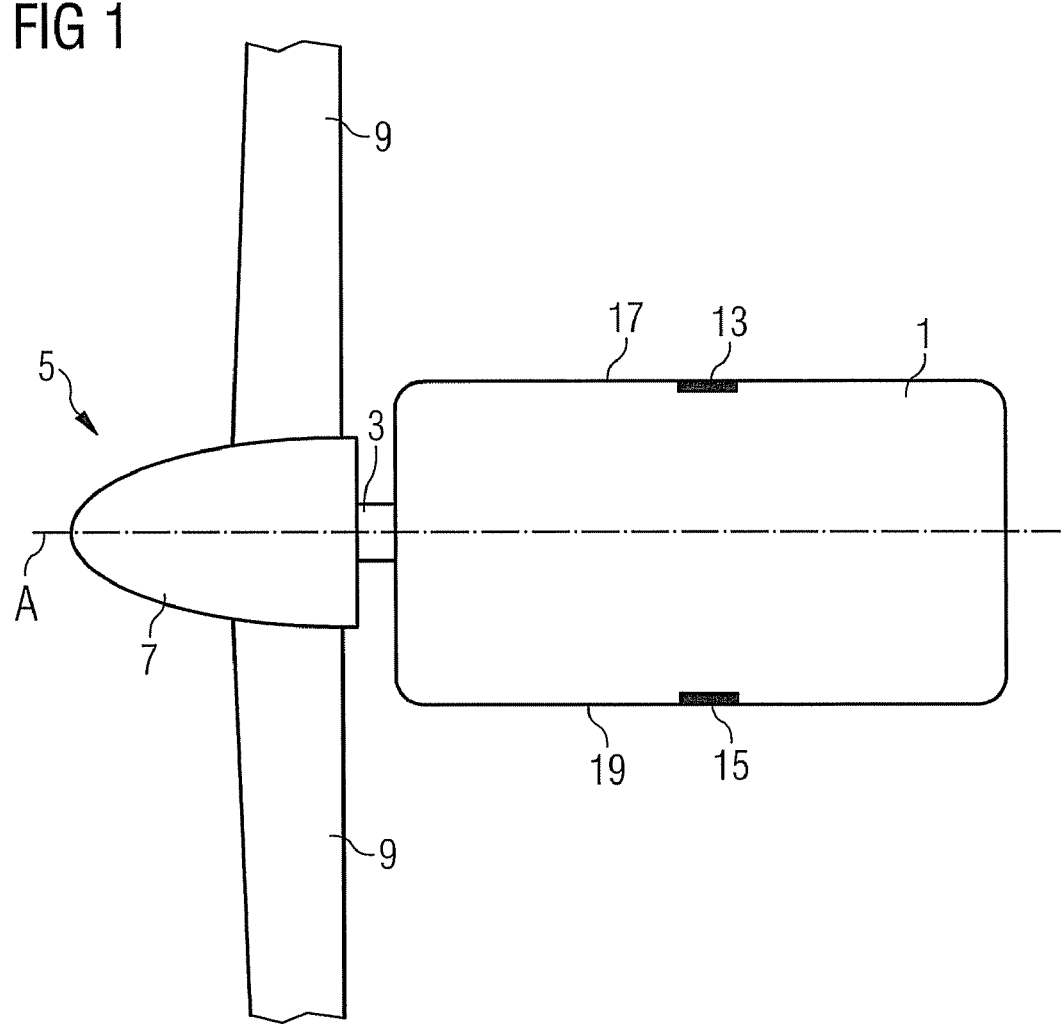
FIG. 1 shows a wind turbine of a first embodiment of the inventive wind turbine arrangement from above.

FIG. 1 shows a wind turbine of an inventive wind turbine arrangement as seen from above. The wind turbine comprises a nacelle 1 located on top of a wind turbine tower. The tower itself is not visible in the figure since it is located below the nacelle 1. The nacelle 1 houses an electrical generator the moving part of which is connected to the wind turbine rotor 5 by a shaft 3. The rotor 5 comprises a rotor hub 7 from which, in the present embodiment, three rotor blades 9 extend radially outwards (only two of three blades are visible in the figure). Note, that the number of blades may be different from three, for example two. However, three-bladed rotors are the most common for the time being.

Figure 2:
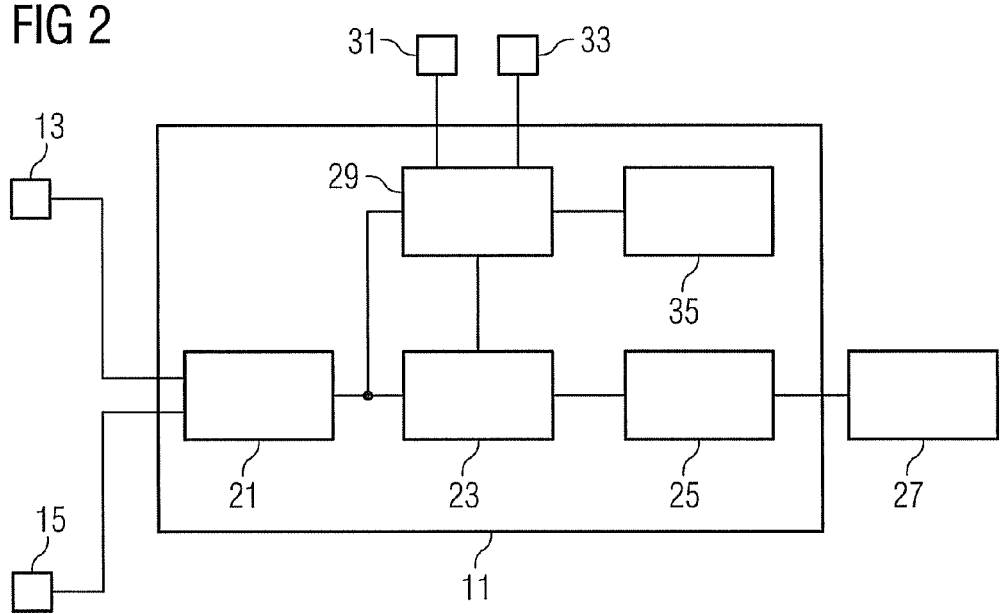
FIG. 2 schematically shows, in form of a block diagram, the yaw alignment controller of the first embodiment.

To achieve optimum conversion of wind power into electrical power the axis A of the shaft 3, i.e. the rotor axis, is to be aligned with the wind direction. In order to achieve alignment of the axis A with the wind direction a yaw drive is located between the tower top and the nacelle 1 (the yaw drive is not visible in FIG. 1). Furthermore, a yaw alignment controller is present which produces control signals representing a turning of the wind turbines rotor axis A which leads the rotor axis A to align with the wind direction. The yaw alignment controller and the yaw drive are schematically shown in FIG. 2.

In the present embodiment, the yaw alignment controller 11 is connected to a first Pitot tube 13 and a second Pitot tube 15 which are located at a first side 17 and a second side 19 of the nacelle, respectively. The second side 19 is located opposite to the first side 17. Hence, the first Pitot tube 13 measures the dynamic pressure of the wind at a first side 17 of the nacelle 1 while the second Pitot tube 15 measures the dynamic pressure of the wind at the opposite side 19 of the nacelle 1. The first and second pressure gauges produce first and second pressure signals, respectively. Note that Pitot tubes are only one possible kind of pressure gauges which may be used with the present invention. Other pressure gauges, also such pressure gauges measuring static pressure instead of dynamic pressure, may be used, as well. Examples of other pressure gauges are strain gauges, Piezoelectric pressure sensors, membrane pressure sensors, etc.

In the yaw alignment controller 11 the first and second pressure signals produced by the first and second Pitot tubes 13, 15 are received by a subtraction unit 21 which subtracts the first pressure signal from the second pressure signal, or vice versa and outputs a difference signal representative of a difference between the first and the second pressure signal, i.e. representing the pressure difference between both sides 17, 19 of the nacelle 1.

The subtraction unit 21 can, for example, be realized as a differential amplifier. Note that, like all other units of the yaw alignment controller 11, the subtraction unit 21 can, in principle, be realized in faun of hardware as well as in form of software running on a suitable hardware environment.

The difference signal is received by a comparator 23 which is connected to the subtraction unit 21 for receiving the difference signal and which compares the difference signals with a defined maximum limit In case the defined maximum limit is exceeded a yaw misalignment has occurred that is out of acceptance limits. In this case the comparator determines the extends by which the given maximum limit is exceeded and produces a comparation signal representing the extend by which the defined maximum limit is exceeded.

The comparation signal is received by a control unit 25 which is connected to the comparator 23 and which produces, on the basis of the comparation signal, a control signal representing a turning of the rotor axis A in horizontal direction in order to realign the axis with the wind direction. This control signal is then output to the wind turbine's yaw drive 27.

In the present embodiment, the comparator 23 receives the defined maximum limit from a calibration unit 29 which is connected to the subtraction unit 21, to a rotor speed sensor 31 and to a wind speed sensor 33. In addition, the calibration unit 29 is connected to a memory 35. The calibration unit 29 serves for calibrating the defined pressure difference maximum limit according to wind speed and rotor speed in order to account for minor non-symmetries in the air flow around the nacelle 1 which may be introduced by the rotation of the rotor 5. Such calibration can, for example, be repeatedly done in given time intervals or as soon as certain changes in rotor speed and/or wind speed are detected.

In the calibration process, the calibration unit 29 produces corrective values for the defined maximum limit used in the comparator. This correction values are stored in the memory 35, e.g. in form of a table assigning correction values to measurement values of wind speed and/or rotor speed. After the calibration process, the calibration unit 29 then retrieves, depending on the measured wind speed and/or rotor speed, a correction value corresponding to the measured wind speed and/or rotor speed and corrects the defined maximum limit with the retrieved correction value before the defined maximum limit is output to the comparator 23.

In this embodiment the difference signal is received from the subtraction unit 21 only for performing the calibration process. However, instead of correcting the defined maximum limit it is also possible to correct the difference signal. In this case, the comparator 23 would not be directly connected to the subtraction unit 21, as it is in embodiment shown in FIG. 2, but only via the calibration unit 29. The calibration unit 29 would then correct the difference signal received from the subtraction unit 21 with the correction value retrieved from the memory 35. Then the corrected difference signal would be output to the comparator 23. The comparator 23 would, in this case, contain or receive an unmodified defined maximum limit which it would compare with the corrected difference signal.

The yaw alignment controller 11 produces and outputs a control signal which leads to a yawing motion of the nacelle until the defined maximum limit, whether modified or unmodified, is not exceeded anymore. Then, the yawing motion stops since the rotor axis A is realigned with the wind direction within acceptable limits. Although the defined maximum limit is used for starting and stopping the rotation in the present embodiment, a different limit than the maximum limit could be used for stopping the rotation. Such a limit called a minimum limit would, in particular, be smaller than the maximum limit.

Figure 3:
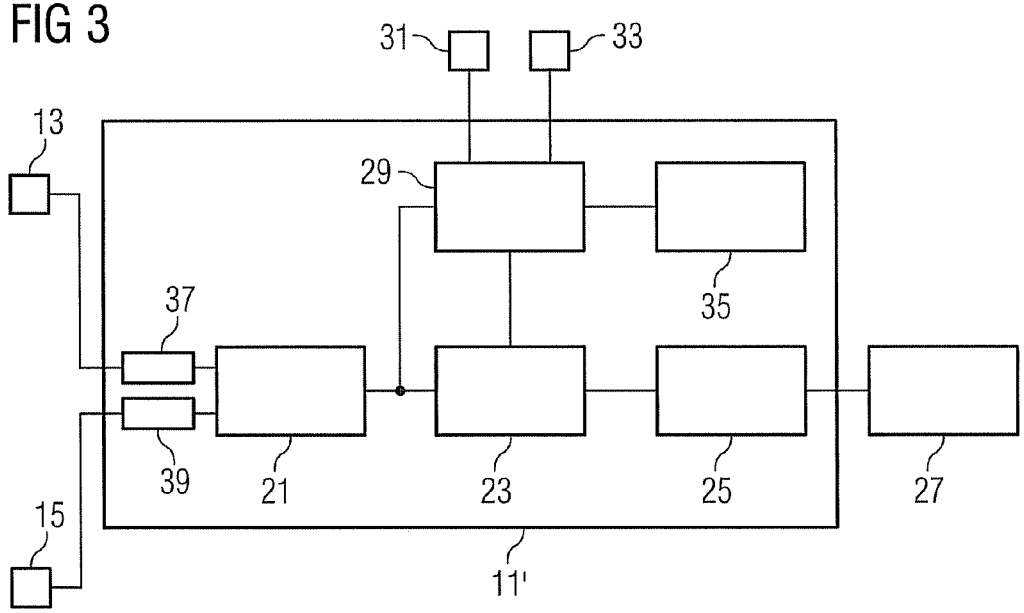
FIG. 3 shows a modification of the yaw alignment controller shown in FIG. 2.

A modification of the controller shown in FIG. 2 is depicted in FIG. 3. Elements of the modified controller 11' which do not differ from the controller 11 of FIG. 2 are denominated with the same reference numerals and will not be described again to avoid redundancies.

The modified controller 11' shown in FIG. 3 differs from the controller 11 shown in FIG. 2 in that the Pitot tubes 13, 15 are not directly connected to the subtraction unit 21. Instead, the first pressure senor 13 and the second pressure sensor 15 are connected to a first integrator 37 and a second integrator 39, respectively. These integrators integrate the received pressure signals over a given time period for producing a first integrated pressure signal and a second integrated pressure signal, respectively. The first integrated pressure signal and the second integrated pressure signal are then further processed in the same way as the first pressure signal and the second pressure signal in the controller 11 shown in FIG. 2. By integrating the pressure signals a more robust determination of the yaw misalignment of the rotor axis A is possible.

Figure 4:
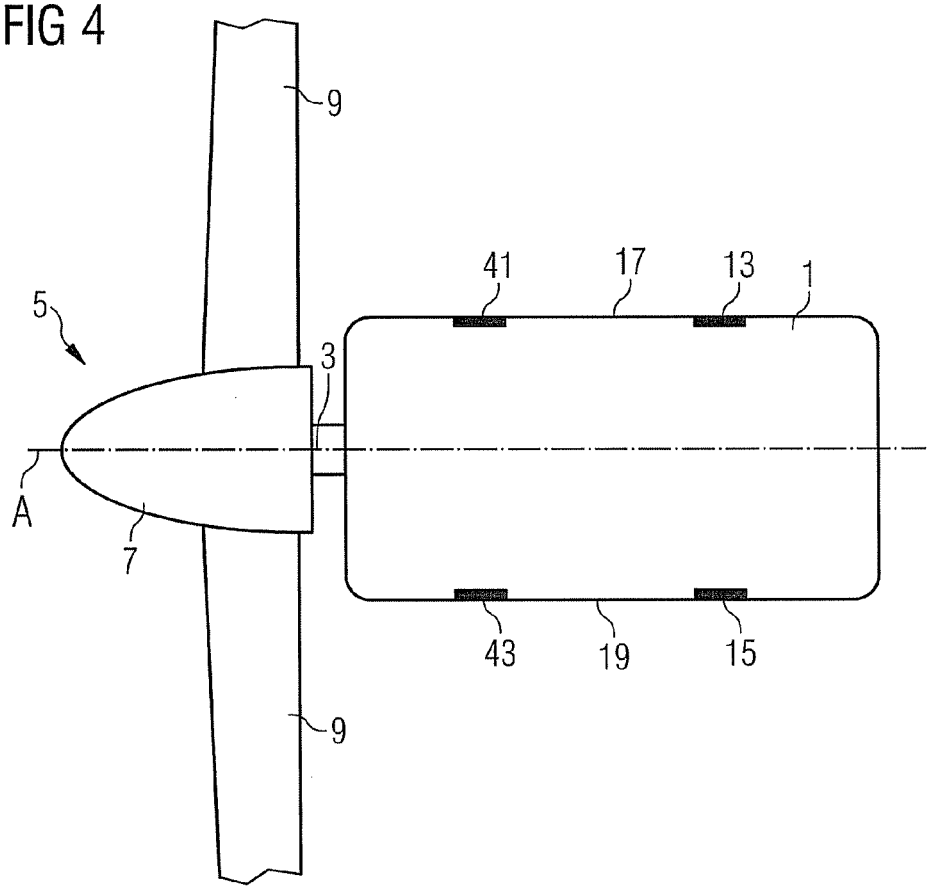
FIG. 4 shows a wind turbine of a second embodiment of the inventive wind turbine arrangement from above.

A wind turbine of a second embodiment of the inventive wind turbine arrangement is shown in FIG. 4. The second embodiment differs from the first embodiment in that additional pressure gauges 41, 43 are present on each side 17, 19 of the nacelle 1. These additional pressure gauges 41, 43 may be pressure gauges of the same kind as the first pressure gauge 13 and the second pressure gauge 15. However, different kinds of pressure gauges may be used as well. In other respects the second embodiment does not differ from the elements of the first embodiment shown in FIG. 1. Therefore, elements which have already been described with respect to the first embodiment and do not differ from elements in the second embodiment are denominated with the same reference numerals and will not be explained again.

Figure 5:
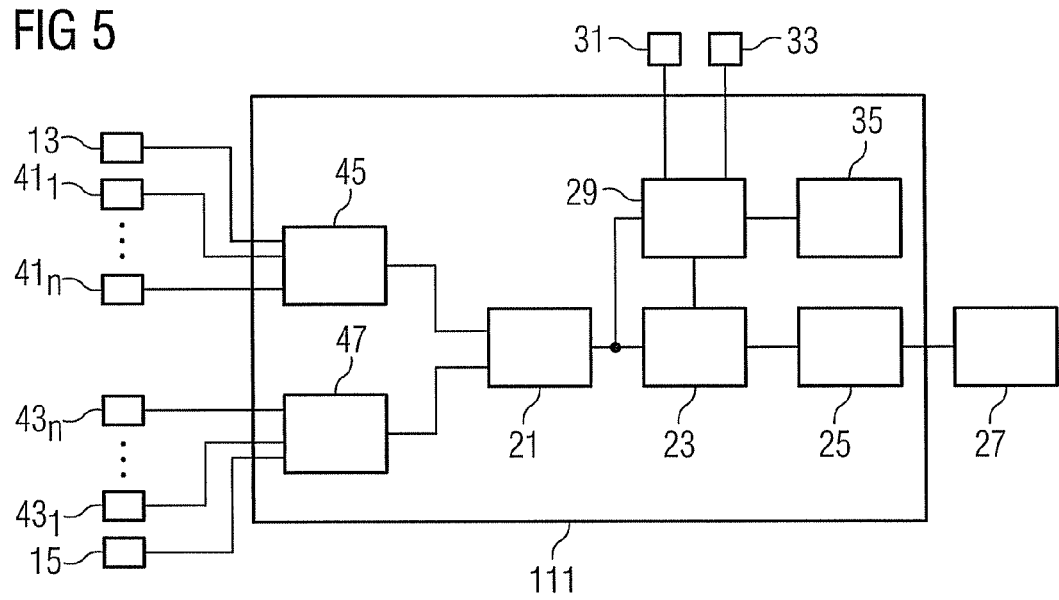
FIG. 5 schematically shows, in form of a block diagram, the yaw alignment controller of the second embodiment.

The yaw alignment controller 111 of the second embodiment is schematically shown in FIG. 5. The controller differs from the controller shown in FIG. 2 in that combination units 45, 47 are present. In other respects the yaw alignment controller 111 does not differ from the yaw alignment controller 11 of FIG. 2. Elements which are identical with those of the yaw alignment controller of FIG. 2 are denominated with the same reference numerals as in FIG. 2 and will not be explained again.

The first combination unit 45 is connected to the pressure gauges 13, $41_1 \ldots 41_n$ at the first side 17 of the nacelle. The second combination unit 47 is connected to the pressure gauges 15, $43_1 \ldots 43_n$ at the second side 19 of the nacelle. The combination units 45, 47 are used for combining the pressure signals of all pressure gauges at one side of the nacelle 1 and to output a first combined pressure signal and a second combined pressure signal, respectively, to the subtraction unit 21.

Combining the pressure signals measured at one side 17, 19 of the nacelle 1 can be done in various ways which depend on the kinds of pressure gauges used for producing the pressure signals. In case all pressure gauges are of the same kind a mean value or a weighted mean value can be used as combined pressure signal. The weights may, e.g., depend on the location of the respective pressure gauges on the side of the nacelle 1.

The first and second combined pressure signals resulting from combining the pressure signals of the pressure gauges are then further processed in the same way as the first and the second pressure signals in the yaw alignment controller 11 shown in FIG. 2.

Although not shown in FIG. 5, the yaw alignment controller 111 may further comprise integration units as they have been described with respect to FIG. 3. Such integration units may be located before or after the combination unit 45, 47. If they are located after the combination units 45, 47 only one integrator would be needed for each side of the nacelle 1. In the other case, an integrator would be needed for each single pressure signal which is to be integrated. Note that it would generally be possible to locate the integrators before the combination units 45, 47 but not integrating each single pressure signal. In particular, if different kinds of pressure gauges are used at a side of the nacelle 1 it may be advantageous to integrate the signals produced by some kinds of pressure gauges while not integrating the signals of other kinds of pressure gauges, i.e. because some kinds of the used pressure gauges already produce integrated signals.

In a modification of the controller 111 in FIG. 5 individual difference signals can be produced for pressure signals delivered by corresponding pressure gauges at the first and second side of the nacelle 1. The individual difference signals are then combined to form a combined difference signal that will be compared to the defined limit. In this case, a number of subtraction units would be present which are located between the pressure gauges and a single combination unit. The combination unit would be further connected to the comparator 23, the calibration unit 29, and the control unit 25.

Figure 6:
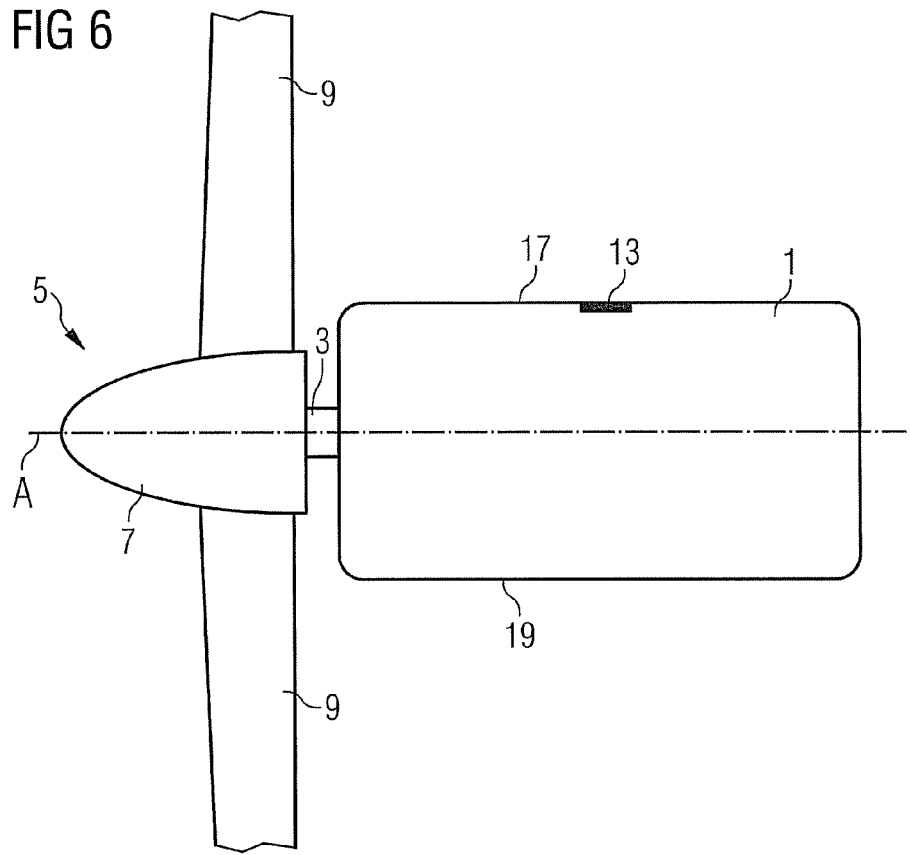
FIG. 6 shows a wind turbine of a third embodiment of the inventive wind turbine arrangement from above.

A wind turbine of a third embodiment of the inventive wind turbine arrangement is shown in FIG. 6. The third embodiment differs from the first embodiment in that only the pressure gauge at the first side 17 of the nacelle 1 is present. In other respects the second embodiment does not differ from the elements of the first embodiment shown in FIG. 1. Therefore, elements which have already been described with respect to the first embodiment and do not differ from elements in the second embodiment are denominated with the same reference numerals and will not be explained again.

Figure 7:
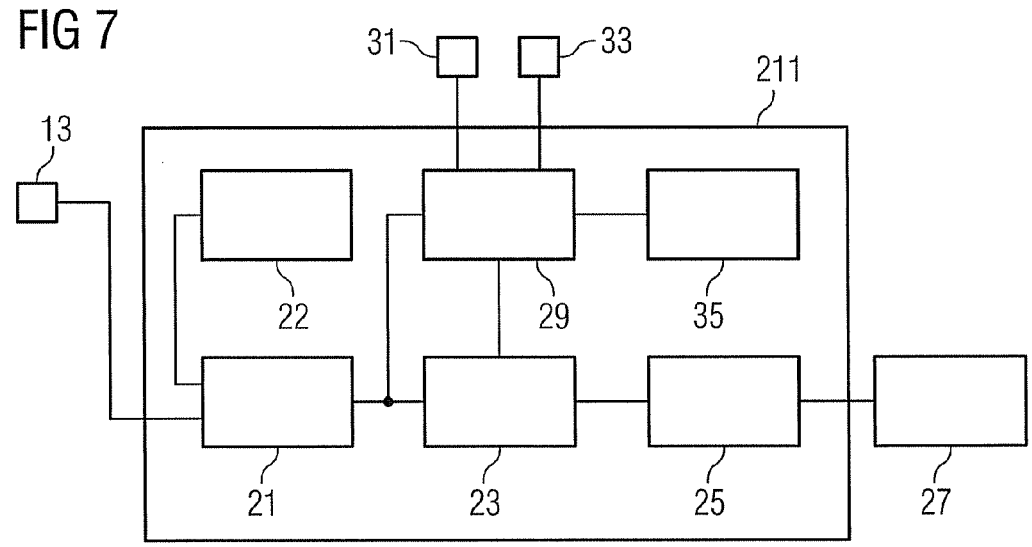
FIG. 7 schematically shows, in form of a block diagram, the yaw alignment controller of the third embodiment.

The yaw alignment controller 211 of the third embodiment is schematically shown in FIG. 7. The controller differs from the controller shown in FIG. 2 in that the subtraction unit 21 is connected to a reference pressure repository 22 containing a reference pressure which is calibrated to correspond to correct alignment of the wind turbine with the wind. The reference pressure is then used instead of the pressure measured by the second pressure gauge of the first embodiment for determining the difference signal. In other respects the yaw alignment controller 211 of the third embodiment does not differ from yaw alignment controller 11 of the first embodiment. Note that the yaw alignment controller 211 of the third embodiment may comprise an integrator as it has been described with respect to FIG. 3 for integrating the pressure signal from the pressure gauge 13 over a given time period.

The calibrated reference pressure may depend on the kind of wind turbine and on the location of the wind turbine. Therefore, a calibration procedure is preferably carried out for each wind turbine after erection. However, if wind turbines of the same kind are used at locations which are expected to show identical wind flow conditions a common reference pressure may be established for such wind turbines, by a single calibration procedure. The calibration procedure for a single wind turbine or a group of similar wind turbines may be repeated from time to time or if wind flow conditions at a wind turbine location have changed, for instance due to newly constructed buildings or new wind turbines in a wind farm which may lead to a wake changing the flow conditions.

Note that, in the third embodiment, the difference signal does not represent the difference between pressures at both sides of the nacelle but the difference between the pressure at a single side of the nacelle and a pressure representing correct alignment of the wind turbine with the wind.

More than one pressure gauge may be used at the first side 17 of the nacelle 1 also in the third embodiment. In this case, the yaw alignment controller 211 would comprise a combination unit as it has been described with respect to the yaw alignment controller 111 of the second embodiment. One or more integrators for integrating one or more of the pressure signals might also be present.

The present invention as described exemplary with respect to the embodiments allows for a robust detection of yaw misalignments so that an improved alignment can be achieved. A better alignment leads to decreasing structural loads and to avoiding power reduction losses due to yaw misalignments.

The invention claimed is:

1. A method for aligning a wind turbine with the wind direction, comprising:
   measuring a first pressure at a first side of a nacelle of the wind turbine;
   determining a pressure difference between the measured first pressure and a second pressure; and
   rotating the nacelle depending on the determined pressure difference.

2. The method as claimed in claim 1,
   wherein a second pressure is measured at a second side of the nacelle of the wind turbine, and
   wherein the second side is located opposite to the first side.

3. The method as claimed in claim 1, wherein the second pressure is a reference pressure which is calibrated to correspond to a correct alignment of the wind turbine with the wind.

4. The method as claimed in claim 1, further comprising integrating the measured first pressure and/or the measured second pressure over a plurality of time periods before determining the pressure difference.

5. The method as claimed in claim 1,
   wherein a first plurality of pressures is measured at the first side of the nacelle and/or a second plurality of pressures is measured at the second side of the nacelle, and
   wherein the first plurality of pressures measured at the first side of the nacelle are combined and/or the second plurality of pressures measured at the second side of the nacelle are combined before determining the pressure difference.

6. The method as claimed in claim 1,
   wherein a first plurality of pressures is measured at the first side of the nacelle and/or a second plurality of pressures is measured at the second side of the nacelle,
   wherein a plurality of pressure differences is determined,
   wherein the plurality of determined pressure differences are combined before rotating the nacelle, and
   wherein the rotating depends on a combined pressure difference.

7. The method as claimed in claim 1, wherein rotating the nacelle, which is dependent on the pressure difference or the combined pressure difference, is started if the pressure difference or combined pressure difference reaches or exceeds a defined maximum limit.

8. The method as claimed in claim 1, wherein rotating the nacelle, which is dependent on the pressure difference or the combined pressure difference, is stopped if the pressure difference or combined pressure difference reaches or falls below a defined minimum limit.

9. The method as claimed in claim 1, further comprising calibrating the pressure difference and/or the defined maximum limit and/or the defined minimum limit according to a wind speed and/or a rotational speed of a rotor of the wind turbine.

10. A wind turbine arrangement, comprising:
   a nacelle including a first side and a second side, the second side is located opposite to the first side;
   a yaw alignment controller, designed to determine a misalignment of the wind turbine with the wind direction and to produce a control signal representing a turning of the wind turbine leading to realignment of the wind turbine with the wind direction; and
   a yaw drive connected to the yaw alignment controller, the yaw drive receives the control signal and aligns the wind turbine with wind direction based on the control signal,
   wherein a first pressure gauge is located at the first side, the first pressure gauge producing a first pressure signal,
   wherein the yaw alignment controller is connected to the first pressure gauge receiving the first pressure signal and is designed to determine the pressure difference between the first pressure signal and a second pressure signal, and
   wherein the yaw alignment controller outputs the control signal, the control signal representing a turning of the wind turbine which is dependent on the determined pressure difference.

11. The wind turbine arrangement as claimed in claim 10, wherein a second pressure gauge is located at the second side, the second pressure gauge producing the second pressure signal,
   wherein the yaw alignment controller is connected to the second pressure gauge receiving the second pressure signal and determines the pressure difference between the first pressure signal and the second pressure signal, and
   wherein the yaw alignment controller outputs the control signal, the control signal representing the turning of the wind turbine which is dependent on the determined pressure difference.

12. The wind turbine arrangement as claimed in claim 11, wherein a reference pressure repository includes a reference pressure which is calibrated to correspond to a correct alignment of the wind turbine with the wind,
   wherein the yaw alignment controller is connected to the reference pressure repository, and
   wherein the yaw alignment controller receives the reference pressure as the second pressure signal.

13. The wind turbine arrangement as claimed in claim 10, wherein the yaw controller includes an integrator which integrates the first pressure signal and the second pressure signal over a given time period producing an integrated first pressure signal and an integrated second pressure signal, and
   wherein the integrated first pressure signal and the integrated second pressure signal are used as the first pressure signal and the second pressure signal.

14. The wind turbine arrangement as claimed in claim 10, wherein a first plurality of pressure gauges is located at the first side and/or a second plurality of pressure gauges is located at the second side, each pressure gauge producing a pressure signal,
   wherein the yaw alignment controller is connected to the first plurality of pressure gauges and to the second plurality of pressure gauges and receives the respective pressure signals, and
   wherein the yaw alignment controller combines a first plurality of pressure signals from the first plurality of pressure gauges to form a first combined pressure signal and/or combines a second plurality of pressure signals from the second plurality of pressure gauges to form a second combined pressure signal before determining the pressure difference.

15. The wind turbine arrangement as claimed in claim 10, wherein a first plurality of pressure gauges is located at the first side and/or a second plurality of pressure gauges is located at the second side, each pressure gauge producing a pressure signal,
   wherein the yaw alignment controller is connected to the first plurality of pressure gauges and to the second plurality of pressure gauges and receives the respective pressure signals,
   wherein the yaw alignment controller determines a plurality of pressure differences, combines the plurality of determined pressure differences to form a combined pressure difference, and
   wherein the yaw alignment controller outputs the control signal representing a turning of the wind turbine which is dependent on the combined pressure difference.

16. The wind turbine arrangement as claimed in claim 10, wherein the yaw alignment controller comprises or is connected to a calibration unit which calibrates a difference between the first pressure signal and the second pressure signal and/or calibrates a defined maximum limit for starting a rotation of the nacelle and/or calibrates a defined minimum limit for stopping the rotation of the nacelle according to wind speed and/or a rotational speed of a rotor of the wind turbine.

17. The wind turbine arrangement as claimed in claim 16, wherein the calibration may be repeatedly done in given time intervals or when a certain change is detected in rotor speed or wind speed.

18. The wind turbine arrangement as claimed in claim 10, wherein the yaw alignment controller comprises a PID-controller or a neuronal network or a fuzzy logic controller or an adaptive controller.

19. The wind turbine arrangement as claimed in claim 10, wherein the first pressure gauge and the second pressure gauge may be a Pitot tube, a strain gauge, a Piezoelectric pressure sensor, a membrane pressure sensor, or any combination thereof.

\* \* \* \* \*